(12) United States Patent
Symens et al.

(10) Patent No.: US 8,701,479 B2
(45) Date of Patent: Apr. 22, 2014

(54) SYSTEM FOR CHARACTERIZING TIRE UNIFORMITY MACHINES AND METHODS OF USING THE CHARACTERIZATIONS

(75) Inventors: Ronald E. Symens, Sioux Falls, SD (US); Byron R. Stanoszek, Hinckley, OH (US); Troy L. Anenson, Uniontown, OH (US); Daniel P. Furst, Cuyahoga Falls, OH (US); Jason A. McIntyre, Akron, OH (US)

(73) Assignee: Commercial Time Sharing Inc., Akron, OH (US)

( * ) Notice: Subject to any disclaimer, the term of this patent is extended or adjusted under 35 U.S.C. 154(b) by 113 days.

(21) Appl. No.: 13/370,541

(22) Filed: Feb. 10, 2012

(65) Prior Publication Data

US 2013/0205883 A1 Aug. 15, 2013

(51) Int. Cl.
*G01M 17/02* (2006.01)
(52) U.S. Cl.
USPC ............................................................ 73/146
(58) Field of Classification Search
USPC ............................................... 73/146–146.8
See application file for complete search history.

(56) References Cited

U.S. PATENT DOCUMENTS

| | | | |
|---|---|---|---|
| 4,366,707 A | 1/1983 | Jarschel | 73/146 |
| 4,704,900 A | 11/1987 | Beebe | 73/146 |
| 4,805,125 A | 2/1989 | Beebe | 364/570 |
| 4,852,398 A | 8/1989 | Cargould et al. | 73/146 |
| 5,309,377 A | 5/1994 | Beebe | 364/571.04 |
| 6,016,695 A | 1/2000 | Reynolds et al. | 73/146 |
| 6,405,591 B1 | 6/2002 | Colarelli, III et al. | 73/462 |
| 6,481,282 B2 | 11/2002 | Douglas et al. | 73/461 |
| 7,213,451 B2 | 5/2007 | Zhu et al. | 73/146 |
| 7,434,454 B2 | 10/2008 | Matsumoto | 73/146 |
| 2005/0081614 A1 | 4/2005 | Zhu | 73/146 |

*Primary Examiner* — Andre Allen
(74) *Attorney, Agent, or Firm* — Renner Kenner Greive Bobak Taylor & Weber

(57) ABSTRACT

A tire uniformity machine includes an apparatus for receiving and rotating a tire. The apparatus includes opposed chuck assemblies for receiving, inflating and rotating the tire and a load wheel applied to the rotating tire to obtain tire test results. At least one characterizing device is associated with components of the apparatus to characterize forces of at least one of the components and the characterized forces are used in adjusting the tire test results.

15 Claims, 7 Drawing Sheets

SYSTEM FOR CHARACTERIZING TIRE UNIFORMITY MACHINES AND METHODS OF USING THE CHARACTERIZATIONS

TECHNICAL FIELD

The present invention relates generally to tire testing equipment. In particular, the present invention relates to characterizing components of a tire uniformity machine. Specifically, the present invention relates to using characterizations of the tire uniformity machine for evaluating tires during normal testing procedures.

BACKGROUND ART

Ideally, a tire is desirable to be a perfect circle, and interior stiffness, dimensions and weight distribution and other features thereof should be uniform around the circumference of the tire. However, the usual tire construction and manufacturing process make it difficult to mass produce such an ideal tire. That is, a certain amount of nonuniformity in the stiffness, dimensions and weight distribution and other features occur in the produced tire. As a result, an undesirable exciting force is produced in the tire while the vehicle is running. The oscillations produced by this exciting force are transmitted to the vehicle chassis and cause a variety of vehicle oscillations and noises including shaking, fluttering, and sounds of the tire vibrations being transmitted inside the vehicle.

Industry standards are available for evaluating nonuniformity of a tire. In one method, a rotating drum, which serves as a substitute for the road surface, presses against a rotatably held tire with a predetermined pressing force (several hundred kilograms), or the tire is pressed against the rotating drum with the predetermined pressing force. The tire and the rotating drum are capable of rotating around their respective rotational axes, in such a way that when either one rotates, the other is also caused to rotate.

In this condition, the tire or the rotating drum is rotatably driven so that the tire rotates at 60 revolutions per minute. As the tire rotates, the exciting force produced by nonuniformity of the tire occurs. This exciting force is measured by one or more force measuring devices (such as a load cell) mounted on a bearing which rotatably supports the tire or the rotating drum, or mounted on a member attached to this bearing. From the measured value, an index that serves to evaluate the nonuniformity of the tire is computed. This measurement is referred to as a uniformity measurement.

Tires on which measurements were performed are classified into those for which the nonuniformity obtained from the index is within tolerable limits and those for which it is not. To the extent possible, tires for which the nonuniformity is outside of the tolerable limits are subjected to processing to decrease the nonuniformity. Tires that have been processed are then subjected to uniformity measurement again; those for which the nonuniformity is within tolerable limits are separated from those for which it is not.

Through the procedure described above, only tires judged to have "nonuniformity within tolerable limits" are selected and shipped to customers (or sent to the next step in the tire evaluation procedure).

Although current tire uniformity machines are believed to be effective, it is believed that further improvements can be obtained. Current tire uniformity machines provide test results that are sometimes inconsistent. In determining whether a uniformity machine is reliable, a same tire will be tested five times to ensure that the machine consistently detects and measures any nonuniformities in the tire. An additional sampling of tires are also then subjected to the same uniformity tests. From this collection of test results, various filters can be generated and applied to production tires to filter actual results. As skilled artisans will appreciate, filtering the test results undesirably adds time to the test procedure. Filtering also raises concerns that the filters may be set to exclude tires that are acceptable and, more problematically, tires that are not acceptable may be passed to allowance. Therefore, there remains a need to accurately and quickly test a tire. As such, there is a need to characterize components of a tire uniformity machine so that those characterizations can be filtered out of the test results so as to more accurately and quickly pass tires to allowance that are acceptable and reject tires that are not acceptable.

SUMMARY OF THE INVENTION

In light of the foregoing, it is a first aspect of the present invention to provide a system for characterizing tire uniformity machines and methods of using the characterizations.

It is another aspect of the present invention to provide a tire uniformity machine, comprising an apparatus for receiving and rotating a tire, the apparatus including opposed chuck assemblies for receiving, inflating and rotating the tire, and a load wheel applied to the rotating tire to obtain tire test results, and at least one characterizing device associated with components of the apparatus to characterize forces of the components, wherein the characterized forces are used in adjusting the tire test results.

Yet another aspect of the present invention is a method for testing tires, comprising receiving and rotating at least one control tire at a time in an apparatus, each control tire having a known characteristic, applying a component of the apparatus to the at least one control tire and generating a component load force, detecting an angular position of the component, correlating the angular position and the component load force, and generating a characteristic waveform of the component from the angular position of the component load force of the at least one control tire.

BRIEF DESCRIPTION OF THE DRAWINGS

This and other features and advantages of the present invention will become better understood with regard to the following description, appended claims, and accompanying drawings wherein:

BEST MODE FOR CARRYING OUT THE INVENTION

Figure 1:
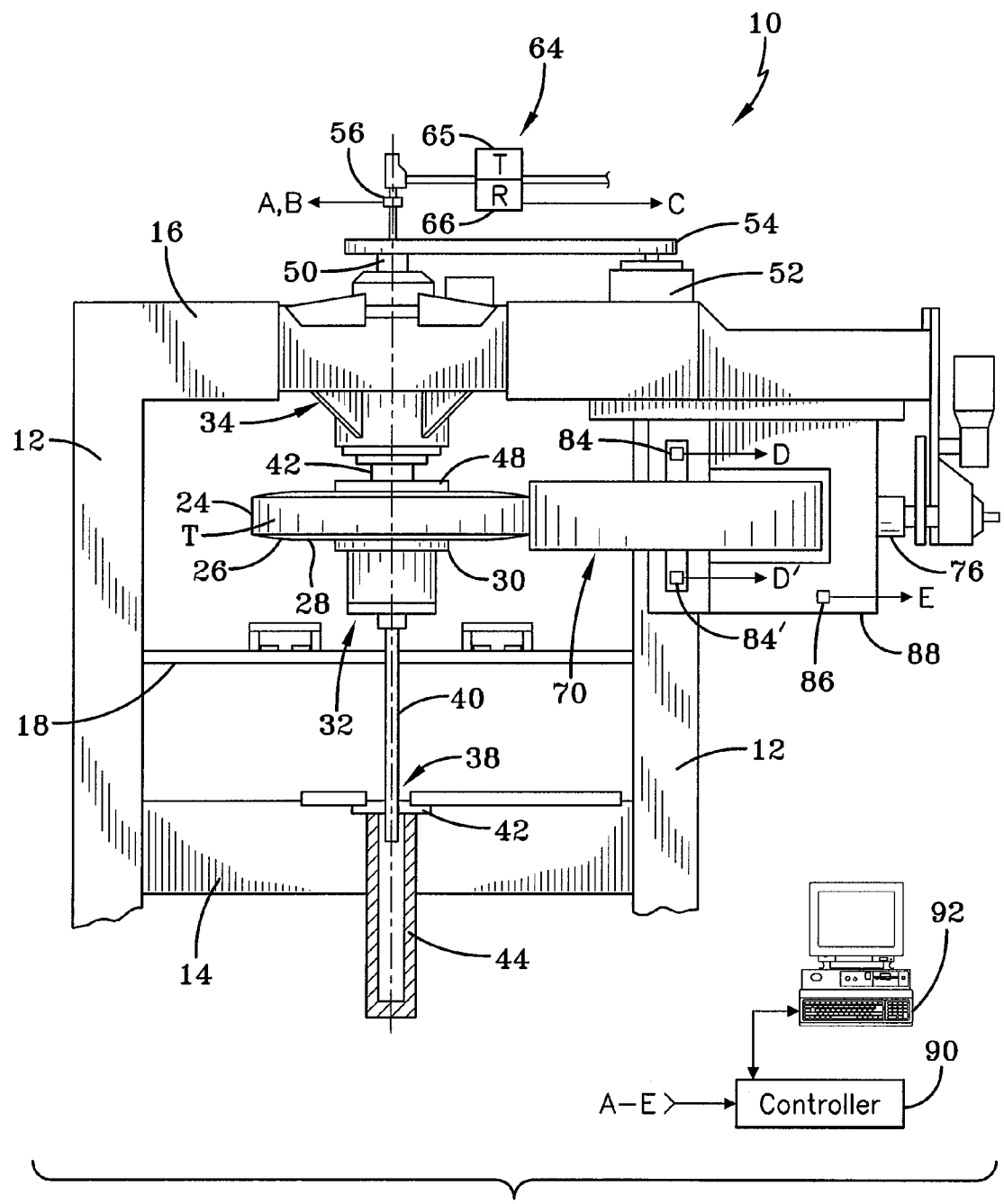
FIG. 1 is a schematic diagram of a tire uniformity machine according to the concepts of the present invention.

Referring now to the drawings and in particular to FIG. 1, it can be seen that a tire uniformity machine is designated generally by the numeral 10. The machine includes side frame members 12 which are connected at respective ends by a horizontal bottom frame member 14 and a horizontal top frame member 16. The side frame members 12 and frame members 14 and 16 form a box-like structure within which a tire, designated generally by the capital letter T is received, tested and discharged.

A conveyor 18 is configured with rollers which have openings therebetween upon which the tire T is delivered to the machine 10. Each tire T includes a tread 24 adjacent substantially parallel sidewalls 26 which have beads 28 forming an inner diameter of the tire.

The machine 10 includes an apparatus for receiving and rotating the tire and, in particular, a lower spindle and chuck assembly 32 and an upper spindle and chuck assembly 34. Both the lower and upper spindle and chuck assemblies are outfitted with removable rims 30 and 48 which can be in various sizes as needed to fit the bead diameter of a tire. The lower spindle and chuck assembly 32 is carried and supported by the frame members 12 and 14 and is positioned so as to engage the tire as it is supported by the conveyor 18. In particular the lower spindle and chuck assembly 32 includes a hydraulic unit 38 which provides a shaft 40 that maintains a piston 42 contained within a cylinder 44. At the appropriate time, the hydraulic unit engages the tire and, in particular the lower bead 28, through an opening in the conveyor 18 so as to move the tire into a testing position.

The upper spindle and chuck assembly 34 receives the other side of the tire T on the rim 48 when the lower spindle and chuck assembly engages the facing sidewall 26 at the bead 28 of the tire on the rim 30 attached to the lower spindle and chuck assembly. The spindle and chuck assembly 34 includes a rim 48 which is rotated by a spindle 50, and the assembly 34 may also include spindle bearings, a rim adapter and other associated components. The spindle 50 is driven by a motor 52 and an interconnecting belt drive 54 which connects the spindle 50 to the motor.

Briefly, in operation, the tire is delivered along the conveyor 18 and stopped at the appropriate position so that the lower spindle and chuck assembly can engage the lower facing side of the tire T. The lower rim assembly then moves the tire into engagement with the upper rim assembly, whereupon the tire is inflated and then rotated to initiate the testing process.

A tire encoder 56 is carried by the upper spindle 50 to monitor the rotational position of the tire T during rotation. The encoder 56 generates a signal A dividing the tire circumference into equal segments and a signal B indicating a fixed single position on the circumference at any given point in time.

A tire inflation system 64 includes an air pressure transducer 65 which monitors the air pressure of the tire and an air pressure regulator 66 to regulate the tire pressure to a desired pressure. As previously indicated, after the chuck assemblies engage the tire, the tire is inflated by the inflation system to a desired pressure prior to testing of the tire. The air pressure transducer 65 generates a pressure signal C.

Figure 2:
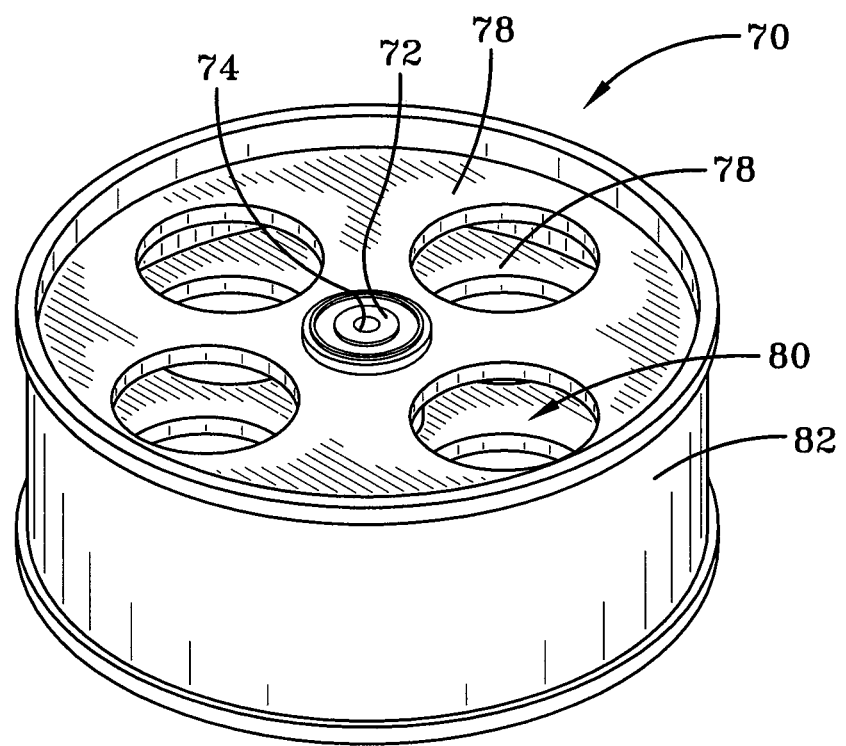
FIG. 2 is a perspective drawing of a load wheel used in the tire uniformity machine.

A load wheel 70 moves horizontally into and out of contact with the tire T so as to apply a load to the tire and test for tire uniformity. As best seen in FIG. 2, the load wheel includes a shaft 72 having a hole 74 therethrough. The load wheel is constructed with at least two substantially parallel spaced apart plates 78, but it will be appreciated that a single plate or multiple plates could be used. Each plate 78 may be provided with a number of openings 80 so as to reduce the weight of the load wheel. The outer diameter of the plates 78 support a radial surface 82 which engages the tire tread as shown in FIG. 1. Skilled artisans will appreciate that the overall construction of the load wheel, including the materials, welds, machining and the like, affects the characteristics and operation of the load wheel 70 and, in turn the machine 10. The same construction concerns are also applicable to the other components of the machine 10 that contact and engage the tire—the upper spindle and chuck assembly 34, the upper rim 48, the lower spindle and chuck assembly 32, the lower rim 30 and the tire inflation system 64. All of these components, no matter how slight, impact the test data collected from the tire during its testing process.

Returning back to FIG. 1, it can be seen that the load wheel is mounted within a carriage 88, which is maintained by the frame members, and moved into and out of position to engage the tire by a motor and gearing assembly 76 also carried by the frame members 12. At least one load cell 84 is associated with the load wheel 70 and detects the forces exerted by the tire on the wheel during rotational movement. Each respective load cell generates a load cell signal D and D'. It will be appreciated that a single load cell may be used but that additional load cells 84 may be provided to confirm the readings of the first load cell signal, or share the force of the load, or to detect slight variations in the tire construction.

A load wheel encoder 86 is carried by the carriage 88 so as to monitor the rotational or angular position of the load wheel. The encoder 86 generates an encoder signal E.

A computer 92, through a controller 90, receives the signals A-E so as to characterize the particular components of the tire uniformity machine and/or acquire other detected measurements generated during the tire testing process. As such, these signals perform their known function of monitoring the variable forces exerted by the tire under test and also to analyze the components of the tire uniformity machine which apply forces to the tire during testing. The controller 90 is also used to generate signals that operate the motors, valves, servos, and converyors needed to move the tire T into the machine and ready it for testing. The controller 90 is connected to a computer 92 which can display and collect the data and also manipulate and analyze the data collected as represented by the signals A-E and any other data signals collected. Skilled artisans will appreciate that the controller 90 and computer 92 may work in tandem or separately to control components of the machine 10 and process and present the data collected into a format usable by manufacturing personnel. Moreover, both the computer and the controller include the necessary hardware, software and memory needed to implement and carry out the operations of the machine 10 and the characterization processes to be described.

Generally, the monitoring of the particular components of the tire uniformity machine is done to characterize the machine's mechanical behavior, whereupon the computer removes the unwanted influences caused by the machine's mechanical condition during production tire testing. Utilization of the machine characterizations determines whether a detected measurement is suitable for use as a valid test result and then, with an analysis based on the machine's mechanical characterization, unwanted waveform properties can be removed which are attributable to the machine's mechanical parts, its measurement apparatus and so on. These unwanted waveform properties can now be specifically identified by the computer and software processes. As such, the unwanted portions of the waveforms that detract from both the precision of the measurement and its conformance (repeatability) to prior measurements can be adjusted for.

Figure 3:
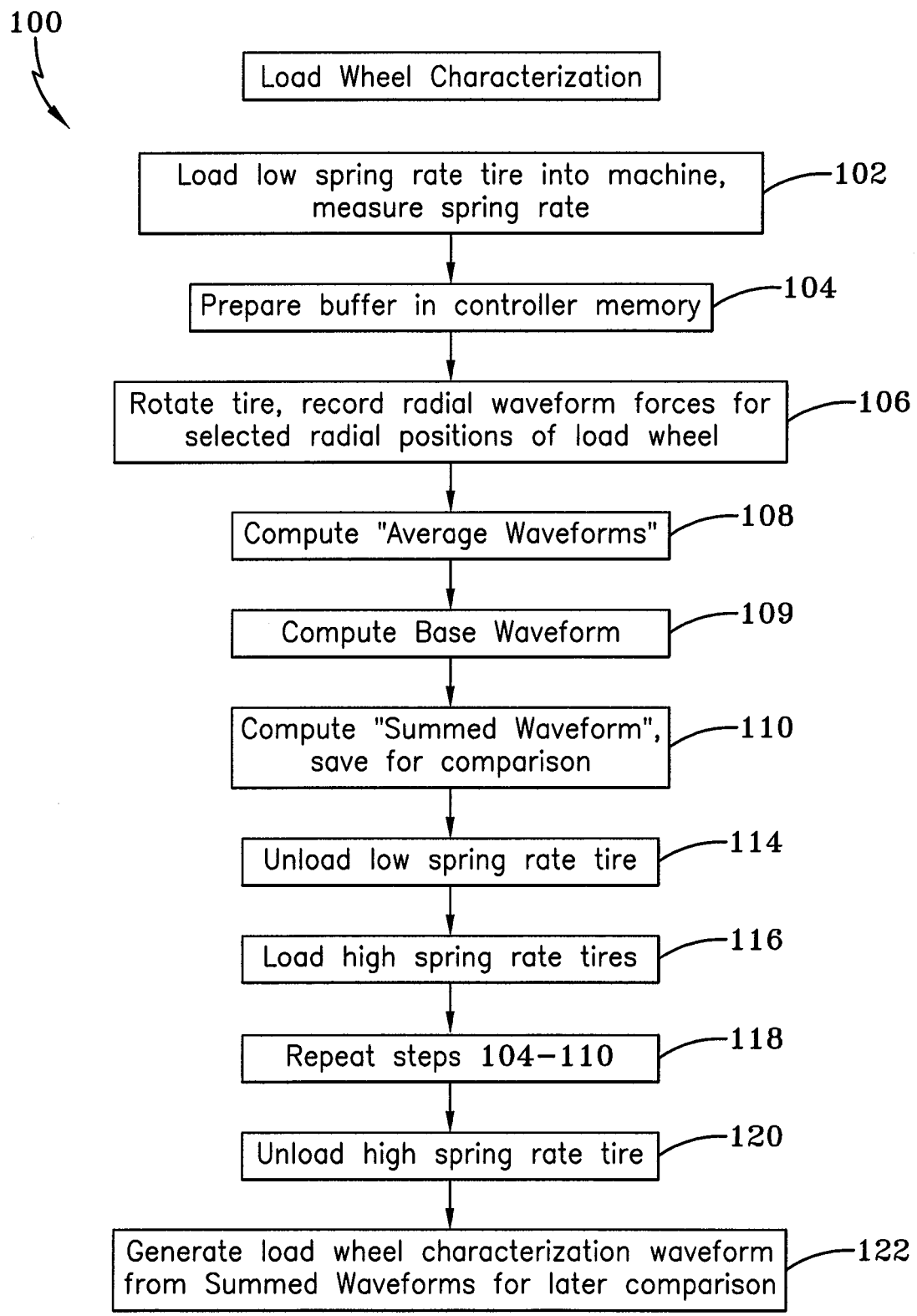
FIG. 3 is a flow chart showing a load wheel characterization process according to the concepts of the present invention.

In order to implement the characterization process, reference is now made to FIG. 3, wherein a load wheel characterization process is designated generally by the numeral 100. In this process, a low spring-rate tire, which has a known spring-rate value, is loaded into the machine. For example, an 800 pounds/inch spring-rate tire is loaded into the machine 10 at step 102. Next, at step 104 the computer 92, which maintains a buffer memory and which provides the needed hardware, software and other memory components to implement the characterization process, prepares a buffer for receipt of data collected by any of the components of the tire uniformity machine and, in particular signals A-E and specifically the load cell signals D, D' and the encoder signal E. As used herein, the "spring-rate" is the increase in radial force as measured on a loaded and inflated tire, for each unit of distance the load wheel advanced toward the spindle that carries the rotating tire.

As a load wheel can never be perfectly round, any amount of run out imposed onto a rotating tire by the load wheel thus exerts a measurable radial force directly relating to the tire's spring-rate. For a division of N evenly-spaced angles around the load wheel, this force is measured and compiled into a waveform of N points that characterizes the force effect of the load wheel at that specific spring-rate. Any number of N points could be used, but in most embodiments at least one hundred N points are required. Accordingly, after the buffer prepared in step 104 is ready, the machine rotates the tire, records the angular waveform forces at various angular positions of the load wheel at step 106.

During the loading process of the present embodiment, it will be appreciated that the tire is allowed to spin for at least one hundred revolutions so as to allow the tire to warm up and settle into a static position on the load wheel. After the buffer has been established, the tire is allowed to spin for at least six hundred more revolutions whereupon an M-point radial force waveform (usually 100 points), in terms of M evenly-spaced angles around the tire, and the rotational position of the load wheel at the beginning of each waveform collection, in terms of N evenly-spaced angles around the load wheel, are recorded for each revolution. Next, at step 108, the computer computes an N-waveform "Average Waveforms" buffer. This is done by examining the saved rotational position of the load wheel for each waveform recorded. This rotational position is rounded to the nearest integer modulo N, and this is designated as position P. For each position P, the computer 92 computes the mean of all waveforms that were collected where the beginning rotational position of the load wheel is P. This resulting average waveform is then stored as the $P_{TH}$ waveform of the "Average Waveforms" buffer.

Next, at step 109, the computer 92 computes a "Base Waveform." This is done by calculating the mean of all waveforms stored across all indexes of the N-waveform "Average Waveforms" buffer, and storing the result as the "Base Waveform."

Next, at step 110, the computer 92 computes a N-point "Summed Waveform" and saves this in the appropriate memory file in the computer 92 for later comparison. In particular, for each of the N waveforms in the "Average Waveforms" buffer, there exist M points of data (beginning at load wheel position P) that contain radial force plus load wheel run out by virtue of how the waveform was recorded. To extract this load wheel run out, the following steps are performed by the computer. For each index Q (from zero to M−1) in each of the N waveforms in the "Average Waveforms" buffer, the load wheel position for that point is determined by the equation (P+Q×N÷ (number of load wheel angles occupied by one revolution of the tire, in terms of N)) rounded to the nearest integer modulo N, and this is designated index S. The point at the $Q_{TH}$ index in each of the N waveforms is subtracted by the point at the $Q_{TH}$ index of the "Base Waveform" and is then added to the $S_{TH}$ index in the "Summed Waveform," and at the same time a count of values for the $S_{TH}$ index is also incremented. After the loop is completed, the point at each index of the "Summed Waveform" is divided by the total count of values added to that index, thus computing the average of the points added to each individual index in the "Summed Waveform." Finally, the computer saves the resulting "Summed Waveform" and spring-rate value from step 102 to the computer's memory as the final load wheel characterization for the chosen spring-rate tire.

At step 114 the low spring-rate tire is unloaded from the machine 10. Next, at step 116 a high spring-rate tire is loaded into the machine. For example, the high spring-rate tire may have a 1,450 pounds/inch$^2$ spring-rate.

Then, at step 118 steps 104-110 are repeated for the high spring-rate tire so as to collect corresponding Average Waveforms and Summed Waveforms for the high spring-rate tire. Next, at step 120 the high spring-rate tire is unloaded.

At step 122 a load wheel characterization waveform from the Summed Waveforms for later comparison is generated. The resulting load wheel characterization waveform can then be applied to the current tire being tested. This is done by subtracting the load wheel characterization waveform from the recorded tire test waveform.

Figure 4:
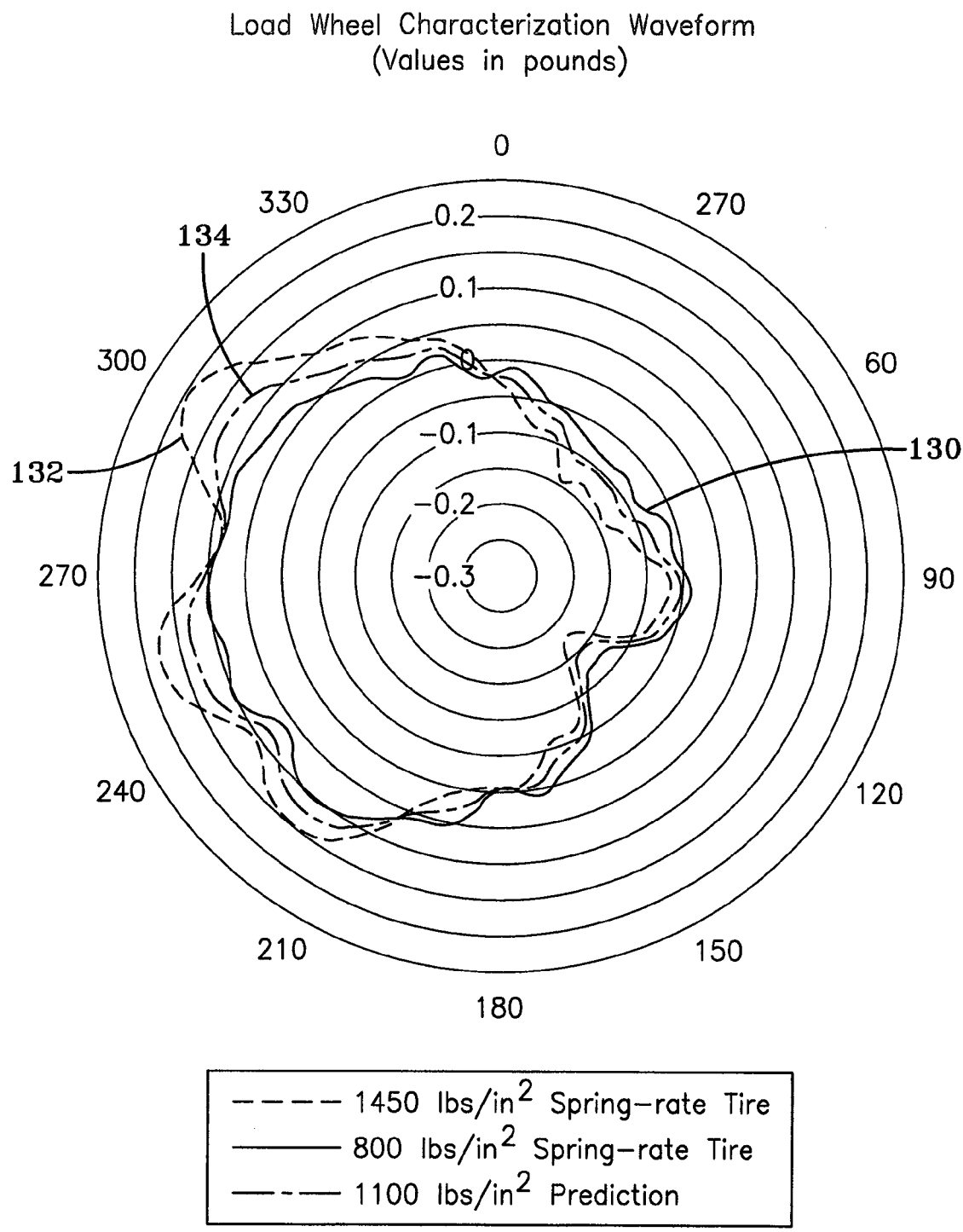
FIG. 4 is a load wheel characterization waveform utilizing known spring-rate tires to obtain a prediction waveform used in the analysis of tires being tested by the tire uniformity machine.

Referring now to FIG. 4, it can be seen that characterization waveforms for the low spring-rate tire, designated generally by the numeral 130, and the high spring-rate tire, designated generally by the numeral 132, are shown. These characterizations illustrate the particular out-of-roundness of the load wheel of the machine 10. As such, it will be appreciated by skilled artisans that each load wheel has a different characterization waveform when tested with a low spring-rate tire and a high spring-rate tire. In any event, these two high and low spring-rate waveforms can be extrapolated to predict a characterization waveform associated with a medium spring-rate tire. It is these median spring-rate tires that will be under test by the tire uniformity machine and this prediction value can be utilized to adjust the uniformity measurements detected by the load cells under a normal test.

Figure 5:
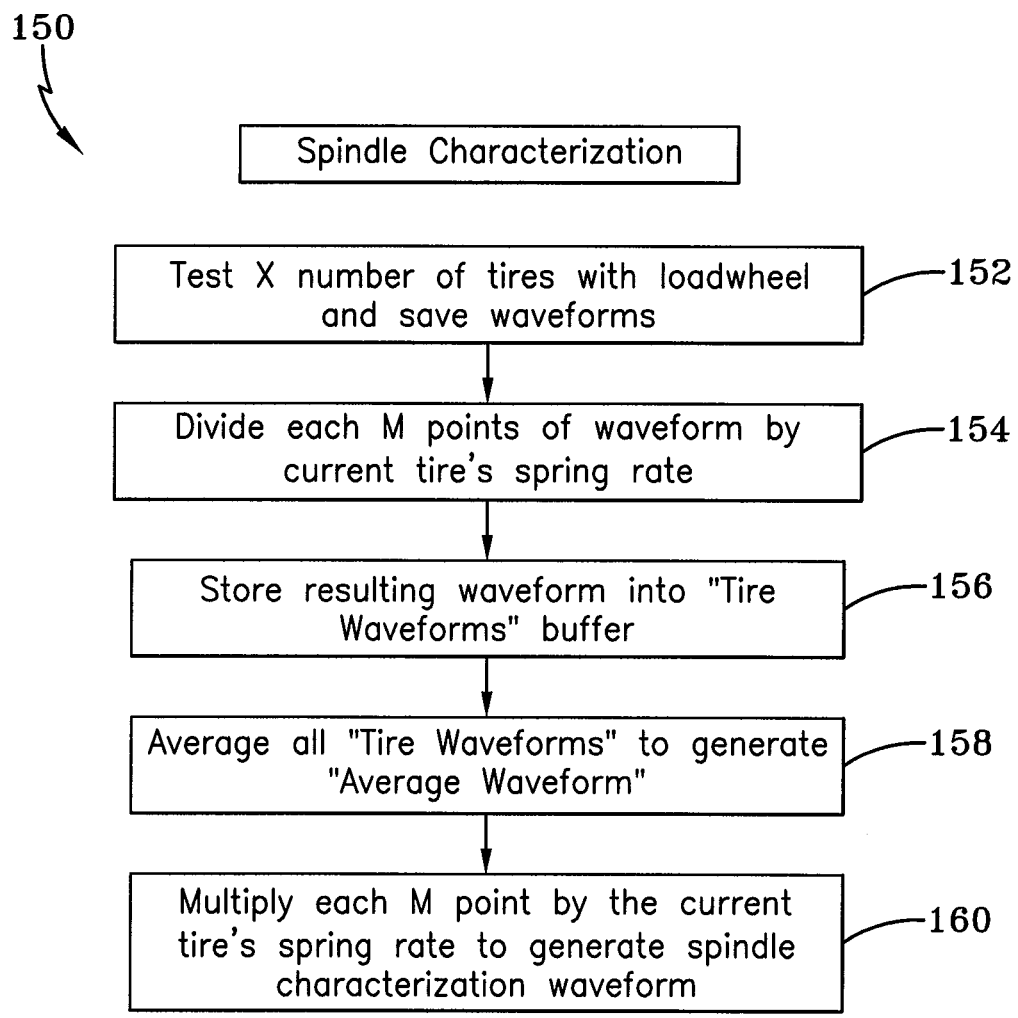
FIG. 5 is a flow chart showing a spindle characterization process according to the concepts of the present invention.

Referring now to FIG. 5, a spindle characterization process is designated generally by the numeral 150. As used herein, the term spindle characterization refers to the characterization of the entire upper spindle, spindle bearings, rim adapter (which is referred to in this description as upper chuck) and the rim. In this process, a large number (L) of tires are tested so as to generate a table of waveforms that can be normalized based upon the spring-rate of a tire. Although L can represent any number, it is believed that the value of L should be at least 750 to provide an accurate spindle characterization. In any event, by using an average from the table of waveforms, the controller or computer can compute a spindle characterization waveform that can be used directly to subtract from the recorded test waveform and produce an accurate picture of the tire's properties.

The process 150 starts at step 152 where a large number of tires are tested by the load wheel 70 and the waveforms for each tire tested are saved in a buffer. This buffer may be referred to as "Tire Waveforms." As in the load wheel characterization process, each waveform may be correlated to M positions around the tire as detected by the tire encoder 56. It will be appreciated in the present embodiment that each test waveform has the load wheel characterization procedure already factored out of its waveform. Although in some embodiments, only the spindle characterization waveform may be used to adjust the waveform of a tire being tested. In any event, no spindle characterization is factored out at this time. At step 154, each M point in the test waveform is divided by the spring-rate of the tire currently under test. In some embodiments, the tire currently under test may also be referred to as a control tire that is used in populating the "Tire Waveforms" buffer. In step 154, all of the tire waveforms in the Tire Waveforms buffer are normalized to the same spring-rate. In other words, as each tire is tested, that tire's spring-rate is used to divide each data point of the newly-inserted waveform. Skilled artisans will appreciate that the spring-rate of the tire under test is determined by the signals D, D' generated by the load cells 84, 84'. At step 156, the resulting waveform is stored in the next available index in the "Tire Waveforms" buffer. If all of the entries in the "Tire Waveforms" buffer are filled, then the oldest waveform test result is deleted from the buffer and the newest waveform, i.e. the one being added, is kept so that there are always L entries in the "Tire Waveforms" buffer.

At step 158, once the "Tire Waveforms" buffer has L entries, that buffer can be used to calculate the spindle characterization. This is accomplished by taking the average of all L waveforms in the "Tire Waveforms" buffer and calling this the "Average Waveform." At step 160, each M point in the "Average Waveform" is then multiplied by the spring-rate of the tire currently under test. In other words, the normalized average of the Average Waveform is multiplied by the current tire's spring-rate. This results in generation of a spindle characterization waveform based on the current tire's spring-rate.

With the resulting spindle characterization waveform, the waveform can be applied to the current tire being tested. This is done by subtracting the spindle characterization waveform from the recorded tire test waveform.

Figure 6:
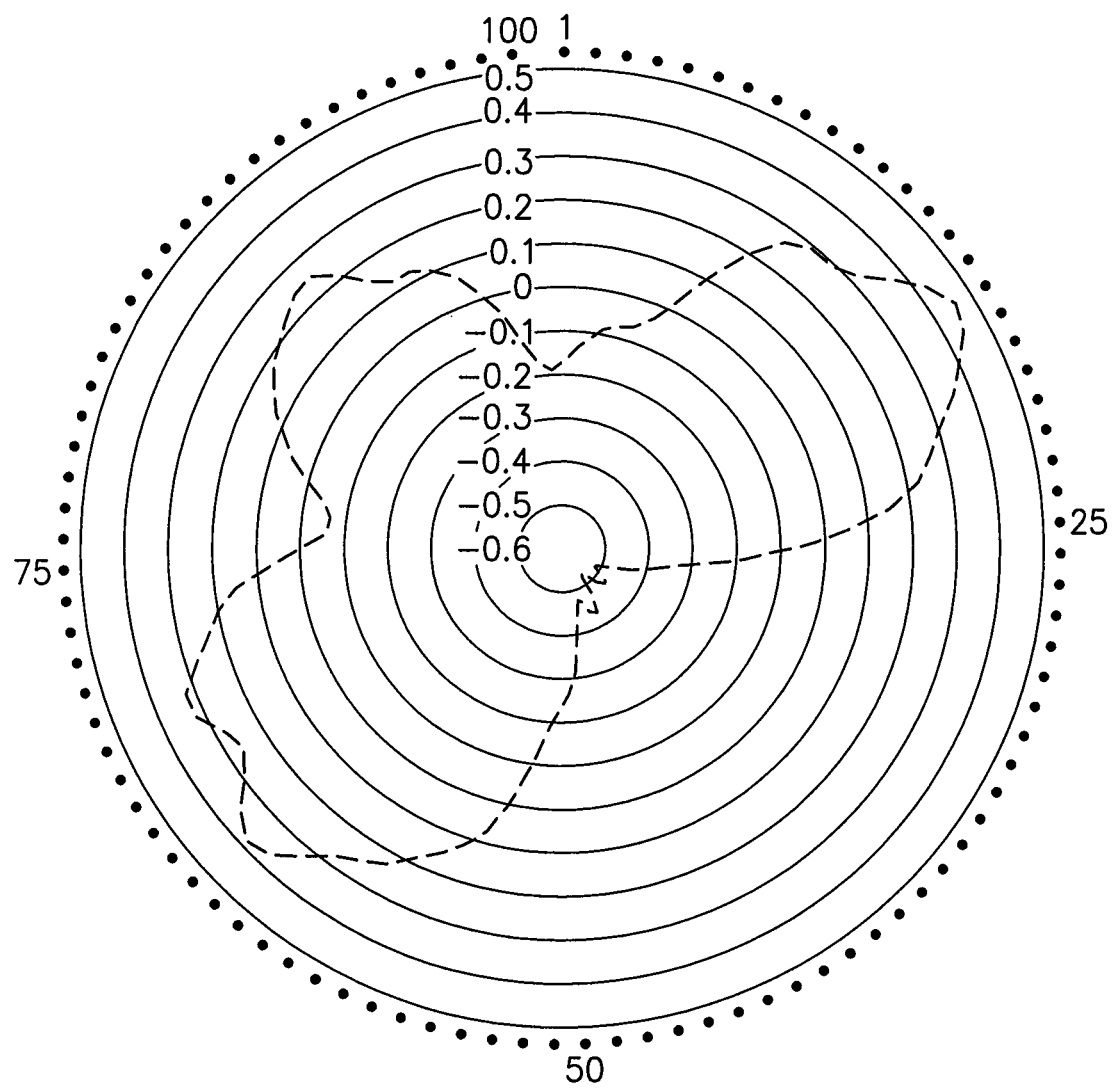
FIG. 6 is an exemplary spindle characterization waveform used in the analysis of a tire being tested by the tire uniformity machine.

As seen in FIG. 6, an exemplary spindle characterization waveform is shown. As such, each tire's waveform is compensated by the spindle characterization waveform based on the tested tire's known spring-rate value so as to provide a final result that is then compared to the known desirable parameters for tire uniformity. Skilled artisans will appreciate that if the tire uniformity machine undergoes any mechanical changes or stress, such as changing the rims or other component of the upper chuck assembly or some physical impact event occurs, then the "Tire Waveforms" buffer should be reset and L number of tires once again be tested before re-computing a spindle characterization.

Figure 7:
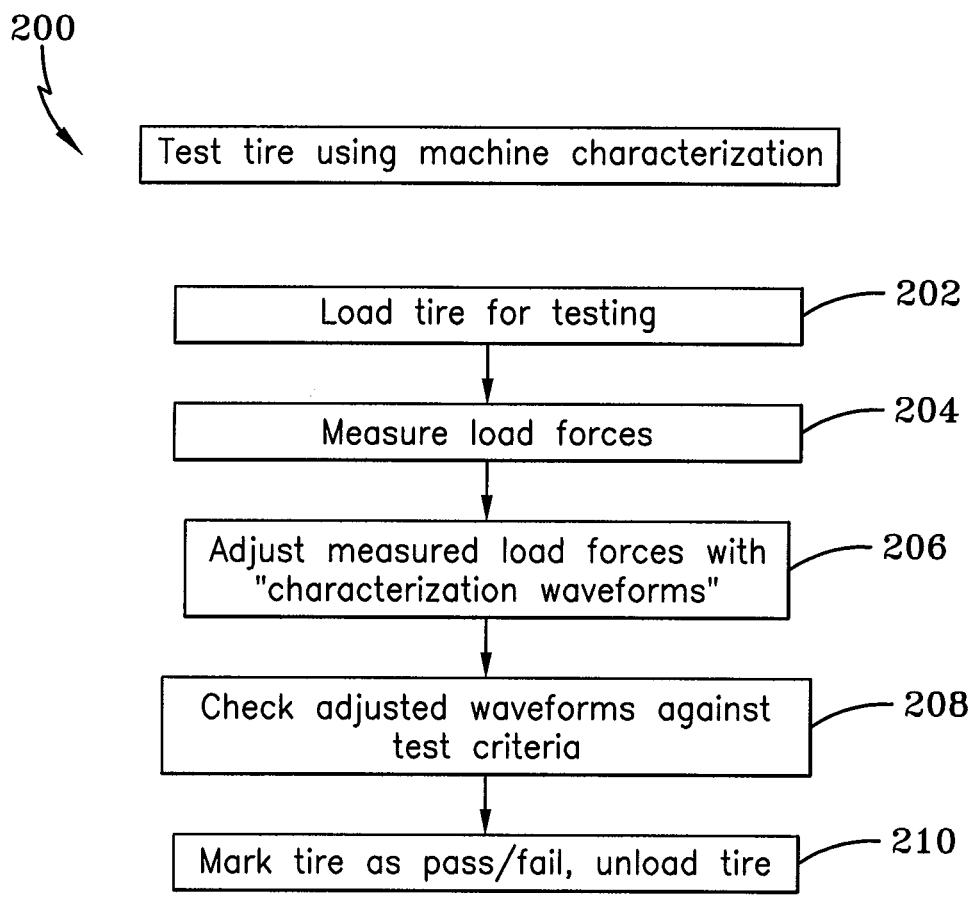
FIG. 7 is a flow chart illustrating testing of tires using the machine characterization waveforms.

Referring now to FIG. 7, a tire test utilizing machine characterization waveforms is designated generally by the numeral 200. In this process, the tire under test is loaded into the machine at step 202 and the load forces are measured by moving the load wheel into contact with the tire as it rotates. These load forces are measured at step 204 and then at step 206 the computer adjusts the measured load forces with the extrapolated characterization waveform determined in the load wheel characterization process 100 and/or the spindle characterization process 150. After these load forces are adjusted, then at step 208 the adjusted waveforms are checked against the test criteria which defines whether certain values of the tire under test are within an acceptable range or not. Then at step 210, the tire under test is marked as either acceptable or unacceptable with a pass/fail designation. Those tires that are passed are allowed to proceed in the tire production process, while the unacceptable tires are withdrawn from the manufacturing process and undergo further evaluation.

Based on the foregoing the advantages of the present invention are readily apparent. By characterizing the components of the machine, those characterizations can be used to accurately identify high spots and low spots on the load wheel and/or adjust for spindle variations so as to accurately determine the characteristics of a machine that is testing a tire. These characteristics can be updated during the useful life of the load wheel or other machine changes to ensure that the measurements being detected are accurate. This allows for adjustments to the testing parameters based on imperfections in the load wheel and other components of the machine so as to eliminate any out of roundness or other problems with the machine. By accurately determining nonuniformity of a tire utilizing the machine characterization waveforms, the reliability of the tire test results are increased.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A tire uniformity machine, comprising:
    an apparatus for receiving and rotating a tire, said apparatus including at least opposed chuck assemblies for receiving, inflating and rotating the tire, and a load wheel applied to the rotating tire, said apparatus obtaining tire test results representing forces applied by the apparatus to the tire and forces generated by the tire in reaction thereto; and
    at least one characterizing device associated with at least one of said components of said apparatus to characterize forces of at least one of said components, wherein the tire test results are adjusted by removing said characterized forces.

2. The machine according to claim 1, further comprising:
    a computer, said at least one characterizing device generating a characterizing signal received by said computer which uses said characterizing signal to adjust the tire test results.

3. The machine according to claim 2, further comprising:
    at least one load cell associated with said load wheel, said at least one load cell generating a load cell signal received by said computer for use in the tire test results.

4. The machine according to claim 3, wherein said computer receives two different load cell signals from said load cell, wherein one said load cell signal represents forces generated by a first tire with a first known spring-rate when the first tire is loaded by said load cell and another load cell signal represents forces generated by a second tire with a second known spring-rate when the second tire is loaded by said load cell, said computer generating a load wheel characterization waveform from said load cell signals which is used to adjust the tire test results.

5. The machine according to claim 4, further comprising:
    an encoder associated with said load wheel and generating a positional signal received by said computer, said computer processing said positional signal and said load cell signals to generate said load wheel characterization waveform.

6. The machine according to claim 2, further comprising:
    at least one load cell associated with said load wheel and generating a load cell signal received by said computer for use in generating a current tire spring-rate; and
    an encoder associated with a spindle extending from one of the chuck assemblies and generating a positional signal received by said computer, said computer processing said positional signals and said load cell signal to generate a spindle characterization waveform.

7. The machine according to claim 6, wherein said computer receives said positional signal and said load cell signal for each tire tested and generates a Tire Waveforms buffer.

8. The machine according to claim 7, wherein said computer averages the values in said Tire Waveforms buffer to generate an Average Waveform which is applied to the rotating tire's spring-rate, which is determined by said load cell signal along with an angular position provided in said position signal, so as to generate a spindle characterization waveform which is used to adjust the tire test results.

9. A method for testing tires, comprising:
receiving and rotating at least one control tire at a time in an apparatus, each said control tire having a known characteristic;
applying a component of said apparatus to said at least one control tire and generating a component load force;
detecting an angular position of said component;
correlating said angular position and said component load force; and
generating a characteristic waveform of said component from said angular position of said component load force of said at least one control tire.

10. The method according to claim 9, further comprising:
receiving and rotating a test tire in said apparatus;
applying said component to the test tire and generating a test tire load force;
detecting an angular position of the test tire and an angular position of said component;
correlating said angular positions with said test tire load force;
generating a test tire waveform of the test tire from said angular position of the test tire and said test tire load force; and
adjusting said test tire waveform with said characteristic waveform.

11. The method according to claim 10, further comprising:
receiving a first control tire having a first known spring-rate in said apparatus;
using a load wheel as said component to obtain a first component load force of said first control tire;
receiving a second control tire having a second known spring-rate in said apparatus;
using said load wheel to obtain a second component load force of said second control tire; and
extrapolating said characteristic waveform from said first and second component load forces.

12. The method according to claim 11, further comprising:
positioning an encoder to detect said angular positions of said load wheel.

13. The method according to claim 10, further comprising:
receiving a plurality of said control tires in said apparatus one at a time;
using a chuck assembly with a spindle as said component to correlate an angular position of each control tire;
using a load wheel to obtain a spring-rate for each control tire;
correlating said angular position and said spring-rate for each control tire as a waveform and storing in a Tire Waveforms buffer;
averaging said waveforms in said Tire Waveforms buffer to generate an Average Waveform; and
generating a spindle characterization waveform from said Average Waveform and a spring-rate of said test tire.

14. The method according to claim 13, further comprising:
adjusting said test tire waveform with said spindle characterization waveform.

15. The machine according to claim 1, wherein said at least one characterizing device measures forces applied by said at least one of said components to the rotating tire.

* * * * *